(12) United States Patent
Liu

(10) Patent No.: US 12,434,827 B2
(45) Date of Patent: Oct. 7, 2025

(54) WING-ENGINE COROTATING VERTICAL TAKEOFF AND LANDING AIRCRAFT WITH PARTIALLY FIXED WINGS

(71) Applicant: Pinliang Liu, Beijing (CN)

(72) Inventor: Pinliang Liu, Beijing (CN)

( * ) Notice: Subject to any disclaimer, the term of this patent is extended or adjusted under 35 U.S.C. 154(b) by 0 days.

(21) Appl. No.: 18/414,600

(22) Filed: Jan. 17, 2024

(65) Prior Publication Data
US 2025/0145285 A1    May 8, 2025

(30) Foreign Application Priority Data
Nov. 2, 2023   (CN) .......................... 202311446879.8

(51) Int. Cl.
*B64C 29/00*   (2006.01)

(52) U.S. Cl.
CPC ................ *B64C 29/0033* (2013.01)

(58) Field of Classification Search
CPC .................................................. B64C 29/0033
See application file for complete search history.

(56) References Cited

U.S. PATENT DOCUMENTS

| | | | | |
|---|---|---|---|---|
| 2,702,168 | A * | 2/1955 | Platt ................... | B64C 29/0033 244/7 R |
| 3,360,217 | A * | 12/1967 | Trotter ................ | B64C 29/0033 D12/330 |
| 6,343,768 | B1 * | 2/2002 | Muldoon ............ | B64C 29/0033 244/7 R |
| 12,139,253 | B1 * | 11/2024 | Bernard ................ | B64C 13/503 |
| 12,157,564 | B2 * | 12/2024 | Burns ........................ | B64C 9/02 |
| 2019/0176980 | A1 * | 6/2019 | Brand ..................... | B64C 27/54 |
| 2019/0263513 | A1 * | 8/2019 | Randall .................... | B64C 27/22 |
| 2021/0024208 | A1 * | 1/2021 | Tao ......................... | B64C 11/32 |
| 2021/0323663 | A1 * | 10/2021 | Liang ..................... | B64U 10/20 |
| 2021/0331794 | A1 * | 10/2021 | Burns ..................... | G05D 1/46 |
| 2021/0394915 | A1 * | 12/2021 | Carlson .................... | H02J 7/34 |
| 2022/0315217 | A1 * | 10/2022 | Sabadash ................ | B64C 27/28 |
| 2022/0371727 | A1 * | 11/2022 | Ross ...................... | B64U 50/19 |
| 2022/0402602 | A1 * | 12/2022 | Moy ...................... | B64D 27/34 |
| 2023/0331379 | A1 * | 10/2023 | Filho ..................... | B64C 1/0009 |
| 2024/0043146 | A1 * | 2/2024 | Liu .......................... | B64C 3/385 |
| 2024/0124135 | A1 * | 4/2024 | Schafer ................ | B64C 29/0033 |
| 2024/0158071 | A1 * | 5/2024 | Wilson ..................... | B64C 3/56 |

\* cited by examiner

*Primary Examiner* — William L Gmoser
(74) *Attorney, Agent, or Firm* — Notaro, Michalos & Zaccaria P.C.

(57) ABSTRACT

A wing-engine corotating vertical takeoff and landing aircraft with partially fixed wings is provided. The aircraft includes an aircraft fuselage, and front wings and rear wings arranged on the aircraft fuselage. Each of the front wings and the rear wings includes a fixed wing connected with the aircraft fuselage, and a tiltwing is hinged with an end, away from the aircraft fuselage, of the fixed wing. A rotational axis of the tiltwing extends horizontally inward and is perpendicular to an axis of the aircraft fuselage. Each tiltwing is provided with a propeller tilting along with the tiltwing. Geometrically, one end of a rotating shaft of the propeller is arranged on the tiltwing, and the other end of the rotating shaft of the propeller extends along the advancing or ascending direction of the aircraft fuselage, and the rotating shaft forms a negative angle with the plane where the tiltwing is located.

7 Claims, 2 Drawing Sheets

WING-ENGINE COROTATING VERTICAL TAKEOFF AND LANDING AIRCRAFT WITH PARTIALLY FIXED WINGS

CROSS-REFERENCE TO RELATED APPLICATION

This patent application claims the benefit and priority of Chinese Patent Application No. 2023114468798, entitled "WING-ENGINE COROTATING VERTICAL TAKEOFF AND LANDING AIRCRAFT WITH PARTIALLY FIXED WINGS" filed on Nov. 2, 2023, the disclosure of which is incorporated by reference herein in its entirety as portion of the present application.

TECHNICAL FIELD

The present disclosure relates to the technical field of aircrafts, in particular to a wing-engine corotating vertical takeoff and landing aircraft with partially fixed wings.

BACKGROUND

Common helicopters mainly adopt the turboshaft engine to output power to the main reducer to drive the set of main rotors to provide lift, and the main reducer additionally drives a set of tail rotors to balance the torque brought by the main rotors, so that vertical takeoff and landing in a small area are realized. A common tiltrotor aircraft realizes the vertical flight mode of a helicopter and the horizontal flight mode of a conventional fixed-wing aircraft through two tilt rotors in symmetrical positions. When the aircraft needs to take off and land vertically, the propeller disc surface of the tilt rotor is parallel to the ground, and the rotor rotates to provide the lift. When the aircraft needs to fly forward quickly, the angle change of the tilt rotor is achieved through the nacelle tilting, so that the propeller disc surface forms an included angle of 70° to 90° with the ground, which is similar to the fixed-wing aircraft to form forward thrust and provide a part of aircraft lift to realize forward flight.

Conventional tiltrotor aircrafts are slow in tilting and need high requirements on speed. When the aircraft needs to switch from the helicopter mode to the fixed-wing mode, it requires relatively high horizontal flight speed, and the aircraft should to be accelerated for a long time in the helicopter mode. Correspondingly, when the aircraft needs to switch from the fixed-wing mode to the helicopter mode for landing in a small area, the aircraft should be decelerated for a long time before tilting. These structural designs and flight control need high requirements on flight environments and landing environments, which are difficult to adapt the application requirements from actual complex environments.

SUMMARY

The embodiments aim to provide a wing-engine corotating vertical takeoff and landing aircraft with partially fixed wings, so as to solve the problems in the prior art. In a hovering state, the aircraft flies completely rely on the suspension achieved by the vertical power generated by the engines. In a horizontal flight state, the aircraft flies completely rely on the lift by the wings at a sufficiently high speed. In a transition state, both mechanisms for the hovering and horizontal flight states are combined, so that the aircraft always flies in the most reasonable working mechanism at any tilt angle of the tiltwing.

In order to achieve the purposes, the present disclosure provides the following solution. The present disclosure provides a wing-engine corotating vertical takeoff and landing aircraft with partially fixed wings, including an aircraft fuselage, and front wings and rear wings arranged on the aircraft fuselage. Each of the front wings and the rear wings respectively comprises a fixed wing connected with the aircraft fuselage, and a tiltwing is hinged with an end, away from the aircraft fuselage, of the fixed wing. A rotational axis of the tiltwing extends horizontally inward and is perpendicular to an axis of the aircraft fuselage Each tiltwing is provided with a propeller tilting along with the tiltwing. Geometrically, one end of a rotating shaft of the propeller is arranged on the tiltwing, an other end of the rotating shaft of the propeller extends along an advancing or ascending direction of the aircraft fuselage, and the rotating shaft forms a negative angle with respect to a plane where the tiltwing is located.

In some embodiments, an interval of a tilt angle of the tiltwing may be [0, n], and n may be greater than $\pi/2$.

In some embodiments, an overall length of each of the front wings may be greater than an overall length of each of the rear wings, and each propeller may be located at an end, away from a corresponding fixed wing, of each tiltwing. Rotation directions of two propellers on a front side may be opposite. Rotation directions of two propellers on a rear side may be opposite. Rotation directions of two propellers at diagonal positions may be same. A distance between one of the two propellers on the front side and a corresponding one of the two propellers on the rear side along an axis direction of the fuselage may be close to a spacing between the two propellers on the front side.

In some embodiments, the front wings and the rear wings may require a certain extent of torsion, and a torsional trend may be that setting angles of airfoils decrease by degrees from a wing root to a wing tip.

In some embodiments, each of the front wings as a whole may be of a forward-swept wing component. A forward-swept angle of the front wing at one end, near the wing root, of the front wing is ranged from $\pi/12$ to $5\pi/12$. A forward-swept angle of the front wing at an other end, near the wing tip, of the front wing may be smaller than that near the wing root and is greater than zero.

In some embodiments, each of the rear wings as a whole may be a straight wing or a cropped delta wing.

In some embodiments, a span length of the tiltwing may be matched with a rotational radius of the propeller.

In some embodiments, the front wings may be located below the rear wings along a vertical direction.

In some embodiments, a center of gravity of a whole aircraft in hovering state under any load may coincide with an equivalent lift center of a sum of a maximum rated lift generated by all propellers.

In some embodiments, each of the fixed wings of the front wings may be provided with a balanced rudder, and each of the fixed wings of the rear wings may be provided with an elevator.

Compared with the prior art, the embodiments have the following technical effects.

In the hovering state, the aircraft flies completely rely on the suspension achieved by the vertical power generated by the engines. In the horizontal flight state, the aircraft flies completely rely on the lift by the wings at a sufficiently high speed. In the transition state, both mechanisms for the hovering and horizontal flight states are combined, so that the aircraft always flies in the most reasonable working mechanism at any tilt angle of the tiltwing.

BRIEF DESCRIPTION OF THE DRAWINGS

To describe the technical solution in the embodiments of the present disclosure or in the prior art more clearly, the following briefly introduces the drawings required for describing the embodiments. Apparently, the drawings in the following description show merely some embodiments of the present disclosure, and those skilled in the art may still derive other drawings from these drawings without creative efforts.

Figure 1:
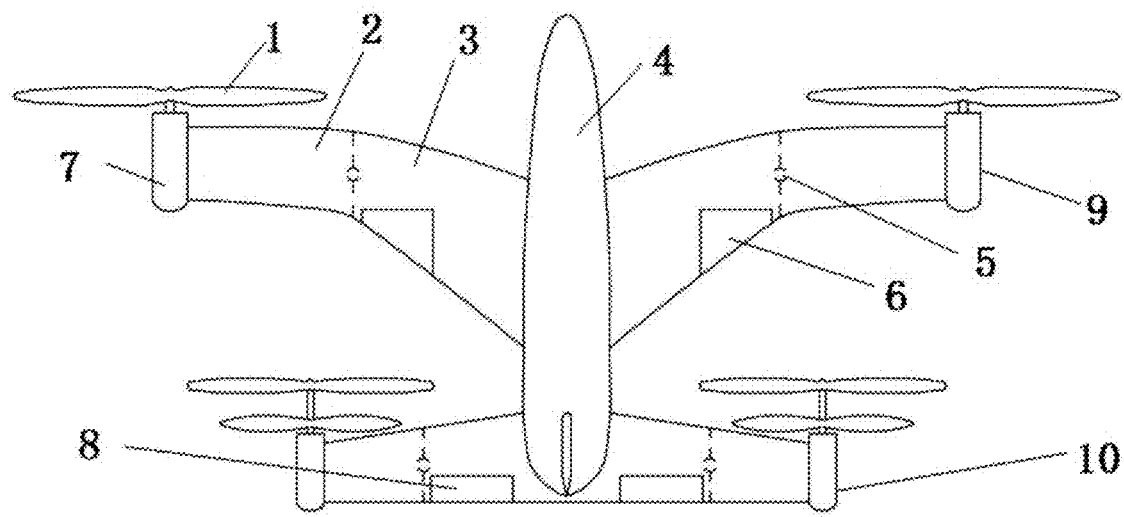
FIG. 1 is a top view of an overall layout of an aircraft according to the present disclosure.

List of the reference characters: 1 propeller; 2 tiltwing; 3 fixed wing; 4 fuselage; 5 hinge point; 6 balanced rudder; 7 engine; 8 elevator; 9 front wing; 10 rear wing; 11 rotating shaft; 12 plane where tiltwing is located; and a negative angle.

DETAILED DESCRIPTION OF THE EMBODIMENTS

The following clearly and completely describes the technical solution in the embodiments of the present disclosure with reference to the embodiments of the present disclosure. Apparently, the described embodiments are merely a part rather than all of the embodiments of the present disclosure. Based on the embodiment in the present disclosure, all other embodiments acquired by the ordinary technical staff in the art under the premise of without contributing creative labor belong to the scope protected by the present disclosure.

The embodiments aim to provide a wing-engine corotating vertical takeoff and landing aircraft with partially fixed wings, so as to solve the problems in the prior art. In a hovering state, the aircraft flies completely rely on the suspension achieved by the vertical power generated by the engines. In a horizontal flight state, the aircraft flies completely rely on the lift by the wings at a sufficiently high speed. In a transition state, both mechanisms for the hovering and horizontal flight states are combined, so that the aircraft always flies in the most reasonable working mechanism at any tilt angle of the tiltwing.

To make the foregoing objective, features and advantages of the present disclosure clearer and more comprehensible, the present disclosure is further described in detail below with reference to the drawings and specific embodiments.

Figure 2:
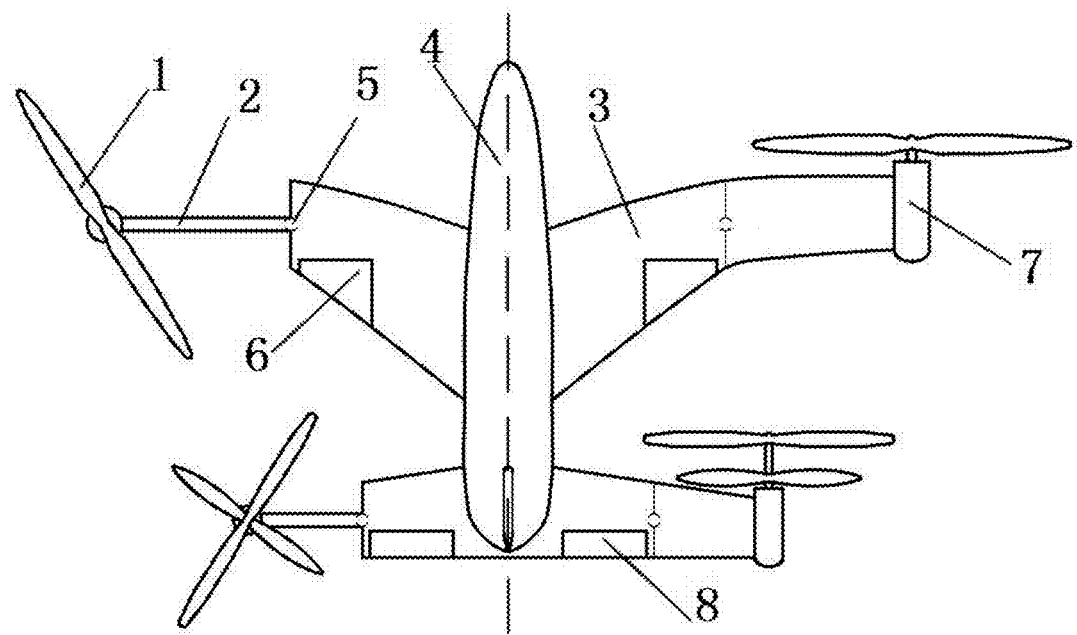
FIG. 2 is a principle diagram of the aircraft according to the present disclosure (the left half part is a schematic diagram in a hovering state, and the right half part is a schematic diagram in a horizontal flight state).
Figure 3:
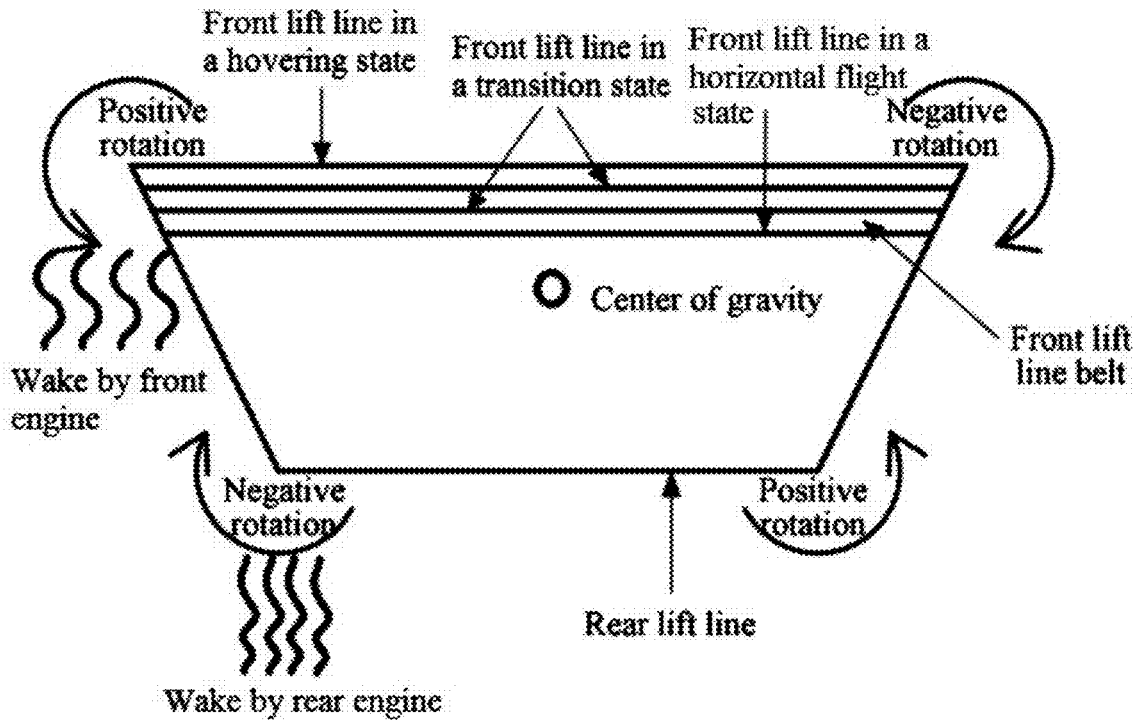
FIG. 3 is an aerodynamic distribution schematic diagram of the aircraft according to the present disclosure.
Figure 4:
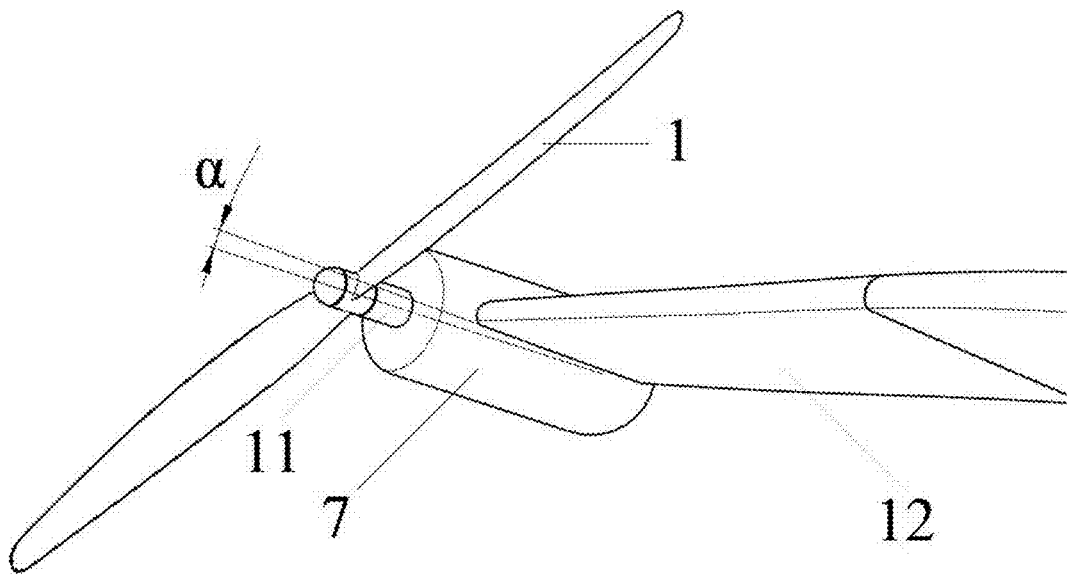
FIG. 4 is a side elevation view of a portion of the aircraft according to the present invention, illustrating a negative angle formed between the rotating shaft and a plane where the tiltwing is located.

As shown in FIG. 1 to FIG. 3, the embodiment provides a wing-engine corotating vertical takeoff and landing aircraft with partially fixed wings. The aircraft includes an aircraft fuselage 4, and front wings 9 and rear wings 10 arranged on the aircraft fuselage 4. Each of the front wings 9 and the rear wings 10 includes a fixed wing 3 connected with the aircraft fuselage 4, and a tiltwing 2 is hinged with the end, away from the aircraft fuselage 4, of the fixed wing 3. An interval of a tilt angle of the tiltwing 2 is [0, n], and n is greater than π/2. The rotational axis of the tiltwing 2 extends horizontally inward and is perpendicular to the axis of the aircraft fuselage 4. Each tiltwing 2 is provided with a propeller 1 tilting along with the tiltwing. Specifically, each tiltwing 2 is provided with an engine 7, and the output shaft of the engine 7 is in transmission connection with the rotating shaft 11 of a propeller 1. Geometrically, one end of the rotating shaft 11 of the propeller 1 is arranged on the tiltwing, and the other end of the rotating shaft 11 of the propeller 1 extends along an advancing or ascending direction of the aircraft fuselage 4. As shown in FIG. 4, the rotating shaft 11 forms a negative angle α with respect to a plane 12 where the tiltwing 2 is located, so that the wakes of the propeller 1 always act on the pressure surface of the tiltwing 2. Preferably, both the front wing 9 and the rear wing 10 require a certain extent of torsion, and a torsional trend is that the setting angles of the airfoils decrease by degrees from wing root to wing tip. The setting angle change rule of the airfoils for wings of the traditional fixed-wing aircrafts can be consulted, but the change magnitude applied herein for the front wing 9 and the rear wing 10 should be smaller as the dead weight of the engine 7 at the wingtip can be utilized. For an aircraft powered by turbine engines 7, heat conduction pipes need to be arranged around each gap between the fixed wing and the tiltwing where the hinge point 5 is located and around each gap where an actuating mechanism at the joint of the rear wing 10 and the fuselage 4 is located. The heat comes from a core engine of the engine 7 on the wing so as to avoid the above gaps from freezing in low-temperature and high-humidity environments.

Specifically, in the application of wing-engine corotation, firstly, in the hovering state, the aircraft flies completely rely on the suspension achieved by the vertical power generated by the engines 7. In the horizontal flight state, the aircraft flies completely rely on the lift by the wings at a sufficiently high speed. In the transition state, both mechanisms for the hovering and horizontal flight states are combined, so that the aircraft always flies in the most reasonable working mechanism at any tilt angle of the tiltwing 2. Secondly, all engines 7 are in corresponding working conditions during the whole flight and are matched with the flight attitudes of the aircraft, and there is no special need to shut down or restart some engines 7 during the flight. Thirdly, a vertical takeoff and landing and high-speed horizontal flight do not interfere with each other in performance realization, and give consideration to each other in functional design. Fourthly, the aircraft can not only realize high maneuvering flight at the low altitude, but also realize high subsonic flight at the high altitude.

The overall length of the front wing 9 is greater than that of the rear wing 10, and each propeller 1 is respectively located at the end of each tiltwing 2 away from the fixed wing 3, so as to form the layout of the propellers 1 distributed in an inverted isosceles trapezoid, where the rotation directions of the front propellers 1 or the rear propellers 1 are opposite, and the rotation directions of the two propellers 1 at diagonal positions are same. The layout of the propellers 1 distributed in an inverted isosceles trapezoid has the following advantages. Firstly, the advantage of high hovering stability of the multi-rotor layout can be exerted in hovering state: on the premise of not pursuing the maximum load, any point in the range surrounded by the rotating shafts of the four engines 7 of the aircraft in hovering state can be the center-of-gravity position vertically, so that the distribution of the lift generated by the four engines 7 of the aircraft in hovering state can mostly cover the gravity distribution of the whole aircraft, so as to increase the fault tolerance rate when the center-of-gravity of the whole aircraft is deviated from the designed center-of-gravity under the actual load. Secondly, the advantage of flexible attitude control of multi-rotor layout can be exerted in hovering state. Specifically, the attitude control of multi-rotor layout in hovering state is achieved by generating torque difference through synchronous acceleration and deceleration of different pairs of engines 7: one pair of the engines 7 at one diagonal position of the inverted isosceles trapezoid are accelerated and the other pair of the engines 7 at the other diagonal position of the inverted isosceles trapezoid are decelerated to control yawing, by generating the torque difference with the total lift is kept unchanged (similarly for the other two); one pair of the engines 7 on the same side of left or right are accelerated and the other pair of the engines 7 on the other side are decelerated to control rolling; and one pair of the engines 7 on the same anterior or posterior are accelerated and the other pair of the engines 7 on the other half are decelerated to control pitching. Thirdly, the advantage of flexible and arbitrary multi-rotor and fixed-wing combined attitude control can be exerted in transition state. Under combined attitude control in transition state, one pair of the engines 7 at one diagonal position of the inverted isosceles trapezoid are accelerated and the other pair of the engines 7 at the other diagonal position of the inverted isosceles trapezoid are decelerated, which are associated with rudders to control yawing jointly; one pair of the engines 7 on the same side of left or right are accelerated and the other pair of the engines 7 on the other side are decelerated, which are associated with balanced rudders 6 to control rolling jointly; and one pair of the engines 7 on the same anterior or posterior are accelerated and the other pair of the engines 7 on the other half are decelerated, which are associated with elevators 8 to control pitching jointly. Furthermore, the distance between the front propeller 1 and the corresponding rear propeller 1 on the same side of fuselage 4 along the axial direction of the fuselage 4 is close to the spacing between the front propellers 1. In essence, the distance between the front and rear propellers 1 is pulled away along the axial direction of the fuselage 4 to square the inverted isosceles trapezoid relatively to facilitate the stability of hovering state.

The whole front wing 9 is of a forward-swept component, with a forward-swept angle at the end near the wing root ranged from $\pi/12$ to $5\pi/12$, while the forward-swept angle at the end near the wing tip is smaller than that near the wing root and greater than zero. The turning point where the forward-swept angle changes is as smooth as possible. The forward-swept characteristic of the front wing 9 can enable the front propeller 1 of the aircraft to be in the front position in hovering state. The forward-swept wing has the following advantages both in the hovering and horizontal flight states. Firstly, in the hovering state, the forward-swept characteristic of the front wing 9 is beneficial to disperse the distribution of power and reduce the sensitivity of the whole aircraft to center-of-gravity deviation. Secondly, in the horizontal flight state, the forward-swept wings are beneficial to increase the lift, and is suitable for high lift design of high subsonic aircrafts. Preferably, the rear wing 10 is a straight wing or a cropped delta wing integrally.

The span length of the tiltwing 2 is matched with the rotational radius of the corresponding propeller 1, so that a rotating surface of the propeller 1 hardly covers the fixed wing 3 in hovering state (including in vertical takeoff and landing) so as to ensure that the fixed wing 3 is hardly impacted by a downwash flow by the engine 7 in hovering state and transition state. Specifically, the tiltwing 2 and the fixed wing 3 of the front wing 9 or the rear wing 10 are connected through the hinge point 5. The hinge point 5 is usually located near the middle position of the whole front wing 9 or the rear wing 10, and the hinge point 5 of the front wing 9 should generally further satisfy the following of being locating at the turning point where the forward-swept angle changes so as to avoid stress concentration caused by the change of the forward-swept angle as much as possible. That is, the position of the hinge point 5 of the front wing 9 mainly depends on the bending position caused by the change of the forward-swept angle; the position of the hinge point 5 of the rear wing 10 mainly depends on the rotational radius of the rear propeller 1. The section of the joint between the fixed wing 3 and the tiltwing 2 is parallel to the axis of the fuselage 4.

The front wing 9 is located below the rear wing 10 along the vertical direction, and the front wing 9 is located at the lower part of the fuselage 4, close to the belly of the fuselage; and the rear wing 10 is located at the upper part of the fuselage 4, close to the back of the fuselage. The equivalent front lift line of the lift generated by the forward-swept front wings 9 and the front propellers 1 moves back and forth in parallel along with the attitude change of power depending on the tilting conditions of the engines to form a front lift line belt. The front lift line in hovering state is the most forward, the front lift line in the horizontal flight state is the most backward, and the front lift line in the transition state lies between the front lift line in the hovering state and the front lift line in the horizontal flight state. A reasonable forward-swept design of the front wing 9 should narrow the front lift line.

Further, consistent with the structural feature that the rear wing 10 is slightly higher than the front wing 9, the front propeller 1 and the rear propeller 1 are not only significantly staggered from each other in longitudinal positions, but also staggered in vertical positions to a certain extent. In this way, the influence of interference or coupling between the wake by the front and rear propellers 1 can be minimized.

The designed center of gravity of the aircraft depends on the layout and performance of the engines 7. The center of gravity of the whole aircraft in the hovering state under any load coincides with the equivalent lift center of the sum of the maximum rated lift by all propellers 1. That is, the ratio of the longitudinal distance from the aircraft designed center of gravity to the front lift line to the longitudinal distance from the aircraft designed center of gravity to the rear lift line in the hovering state, should be roughly equal to the ratio of the maximum rated lift by the rear propellers 1 to the maximum rated lift by the front propellers 1. The front propellers 1 play a relatively large role in the hovering state, and the lift by which account for more than half of the whole lift, so the center of gravity of the whole aircraft should be slightly close to the front lift line belt.

The fixed wings 3 of the front wing 9 and the rear wing 10 have respective adaptive mounting angles, which can refer to the wing mounting angles of traditional fixed-wing aircrafts. Specifically, the matching of the mounting angles of the fixed wings 3 of the front wing 9 and the rear wing 10 should make the equivalent lift center of the sum of the lift generated by the front wings 9 and the rear wings 10 roughly coincides with the center of gravity of the aircraft when the aircraft is in the horizontal flight state under any load (at this time, the tilt angle of the tiltwing 2 is zero). Therefore, the fixed wing 3 of the front wing 9 is fixed to the fuselage 4, and the mounting angle is not adjustable. The fixed wing 3 of the rear wing 10 is rotatable, and the mounting angle can be fine-tuned according to the actual center-of-gravity position of the aircraft to control pitching for trimming, which is similar to a trimmable horizontal stabilizer of a traditional fixed-wing aircraft.

The fixed wing 3 of the front wing 9 is provided with a balanced rudder 6, and the fixed wing 3 of the rear wing 10 is provided with an elevator 8, so that the aircraft can exert all performances of fixed-wing type flight attitude control even in the transition state, and ensures the flight stability and safety with a combined attitude control mechanism. In order to ensure the effectiveness of the balanced rudder 6, the wingspan of the fixed wing 3 of the front wing 9 should not be too short. In this application, the attitude control mode is the same as that of the traditional fixed-wing aircraft. Aerodynamic torque is generated by control surface deflection. The yawing is controlled by the rudder; the rolling is controlled by the balanced rudders 6; and the pitching is controlled by the elevators 8.

The specific power selection principle is that the functions of the two pairs of engines on the anterior and posterior each have their own emphases, with the pair of engines on the anterior emphasizing on takeoff and landing, and the pair of engines on the posterior emphasizing on propulsion. The power form of the front engines is the propeller 1, with a relatively large rotational radius, and the aircraft tends to fly rely on the front engines in the hovering state to achieve vertical suspension. In design, the vertical suspension should be the most efficient working condition for the front engines, and balance the need of playing a sufficient role for power output under a horizontal propulsion working condition in high-altitude and high-speed environments. The power form of the rear engines is the propeller 1 or an open rotor engine (also called a propfan), with a relatively small rotational radius, and the aircraft tends to fly rely on the rear engines in the horizontal flight state to achieve horizontal propulsion. In design, the horizontal propulsion should be the most efficient working condition for the rear engines, and balance the need of playing a sufficient role when for power output under a vertical suspension working condition in low-altitude and low-speed environments. Theoretically, the open rotor engine with twin contra-rotating propellers is the most ideal power mode for rear engines, which is beneficial to realize high subsonic cruise of aircrafts. The moment of inertia of the front propeller should be obviously larger than that of the rear propeller in the working state of the open rotor engine used in the aircraft.

The advantage of matching power selection with power layout is that the four-engine layout into inverted isosceles trapezoid of wing-engine corotation is matched with the propellers 1 that functionally emphasizes each particularly, so that efficient and agile flight in all attitudes can be realized in a comprehensive and harmonious way, and the transition between any different attitudes is smooth. Due to the power without functionally extremeness and sudden changes in transformation, performances of power can be accurately and omni-directionally realized under various flight attitudes. Particularly, through the four-engine layout, each engine is not overly heavy or huge, so that the propeller 1 with a smaller windward area against less air resistance to facilitate high-speed cruise, and the aerodynamic shape of the whole aircraft is closer to the traditional fixed-wing aircraft. The four-engine layout can easily meet the lift demand of vertical takeoff and landing, and also benefit to avoid falling into the misunderstanding of piling up the number of engines, because the trend of low energy density, low power and large number of aircraft engines can inevitably lead to the increase of engine weight to total weight ratio and the decrease of the total efficiency of power.

Adaptive changes made according to actual requirements are all within the protection range of the present disclosure.

It needs to be noted that for those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, and therefore, all changes, including the meanings and scopes of equivalent elements, of the claims are aimed to be included in the present disclosure. Any mark of drawings in the claims should not be regarded as limitation to the involved claims.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In summary, the contents of this specification should not be understood as the limitation of the present disclosure.

What is claimed is:

1. A wing-engine corotating vertical takeoff and landing aircraft with partially fixed wings, comprising an aircraft fuselage, and front wings and rear wings arranged on the aircraft fuselage, wherein each of the front wings and the rear wings comprises a fixed wing connected with the aircraft fuselage, and a tiltwing is hinged with an end, away from the aircraft fuselage, of the fixed wing; a rotational axis of the tiltwing extends horizontally inward and is perpendicular to an axis of the aircraft fuselage, each tiltwing is provided with a propeller tilting along with the tiltwing; geometrically, one end of a rotating shaft of the propeller is arranged on the tiltwing, an other end of the rotating shaft of the propeller extends along an advancing or ascending direction of the aircraft fuselage, and the rotating shaft forms a negative angle with respect to a plane where the tiltwing is located;

wherein an overall length of each of the front wings is greater than an overall length of each of the rear wings, and each propeller is located at an end, away from a corresponding fixed wing, of each tiltwing, rotation directions of two propellers on a front side are opposite, rotation directions of two propellers on a rear side are opposite, rotation directions of two propellers at diagonal positions are same, and a distance between one of the two propellers on the front side and a corresponding one of the two propellers on the rear side along an axis direction of the fuselage is close to a spacing between the two propellers on the front side;

wherein the front wings and the rear wings require a certain extent of torsion, and a torsional trend is that setting angles of airfoils decrease by degrees from a wing root to a wing tip; and wherein each of the front wings as a whole is of a forward-swept wing component, a forward-swept angle of the front wing at one end, near the wing root, of the front wing is ranged from $\pi/12$ to $5\pi/12$, and a forward-swept angle of the front wing at an other end, near the wing tip, of the front wing is smaller than that near the wing root and is greater than zero.

2. The wing-engine corotating vertical takeoff and landing aircraft with partially fixed wings according to claim 1, wherein an interval of a tilt angle of the tiltwing is [0, n], and n is greater than $\pi/2$.

3. The wing-engine corotating vertical takeoff and landing aircraft with partially fixed wings according to claim 1, wherein each of the rear wings as a whole is a straight wing or a cropped delta wing.

4. The wing-engine corotating vertical takeoff and landing aircraft with partially fixed wings according to claim 3, wherein a span length of the tiltwing is matched with a rotational radius of the propeller.

5. The wing-engine corotating vertical takeoff and landing aircraft with partially fixed wings according to claim 4, wherein the front wings are located below the rear wings along a vertical direction.

6. The wing-engine corotating vertical takeoff and landing aircraft with partially fixed wings according to claim 5, wherein a center of gravity of a whole aircraft in hovering state under any load coincides with an equivalent lift center of a sum of a maximum rated lift generated by all propellers.

7. The wing-engine corotating vertical takeoff and landing aircraft with partially fixed wings according to claim 6, wherein each of the fixed wings of the front wings is provided with a balanced rudder, and each of the fixed wings of the rear wings is provided with an elevator.

* * * * *